(12) United States Patent
Omar

(10) Patent No.: US 8,483,068 B2
(45) Date of Patent: Jul. 9, 2013

(54) SYSTEM AND METHOD OF PERFORMANCE MONITORING OF MULTICAST SERVICES WITH MOBILITY SUPPORT

(75) Inventor: Hassan M. Omar, Mt. Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1024 days.

(21) Appl. No.: 11/694,246

(22) Filed: Mar. 30, 2007

(65) Prior Publication Data

US 2008/0239972 A1    Oct. 2, 2008

(51) Int. Cl.
*H04L 1/00* (2006.01)
(52) U.S. Cl.
USPC ........... 370/241; 370/242; 370/248; 370/252; 370/253; 370/390
(58) Field of Classification Search
USPC .................. 370/390, 241, 242, 249, 252, 253
See application file for complete search history.

(56) References Cited

U.S. PATENT DOCUMENTS

| | | | | |
|---|---|---|---|---|
| 5,727,002 A * | 3/1998 | Miller et al. | ................... | 714/748 |
| 6,269,330 B1 * | 7/2001 | Cidon et al. | .................... | 714/43 |
| 6,829,491 B1 * | 12/2004 | Yea et al. | ...................... | 455/560 |
| 7,333,794 B2 * | 2/2008 | Zappala | ..................... | 455/404.1 |
| 7,508,769 B1 * | 3/2009 | Duffield et al. | ............... | 370/252 |
| 7,554,929 B1 * | 6/2009 | Omar et al. | .................... | 370/252 |
| 7,940,685 B1 * | 5/2011 | Breslau et al. | ................ | 370/251 |
| 2005/0123003 A1 * | 6/2005 | Bordonaro et al. | ........... | 370/516 |
| 2006/0224730 A1 * | 10/2006 | Fok et al. | ...................... | 709/224 |

* cited by examiner

*Primary Examiner* — Dang Ton
*Assistant Examiner* — Robert M Morlan

(57) ABSTRACT

An approach is disclosed for monitoring performance of a network providing multicast and mobility services. A test profile is generated for determining performance of the multicast network. The test profile is uploaded on a mobile host that is configured to communicate over the multicast network, wherein the mobile host is further configured to participate in a test session according to the test profile. Test session information tracked by the mobile host is collected for evaluation of metrics for the performance of the multicast network.

18 Claims, 11 Drawing Sheets

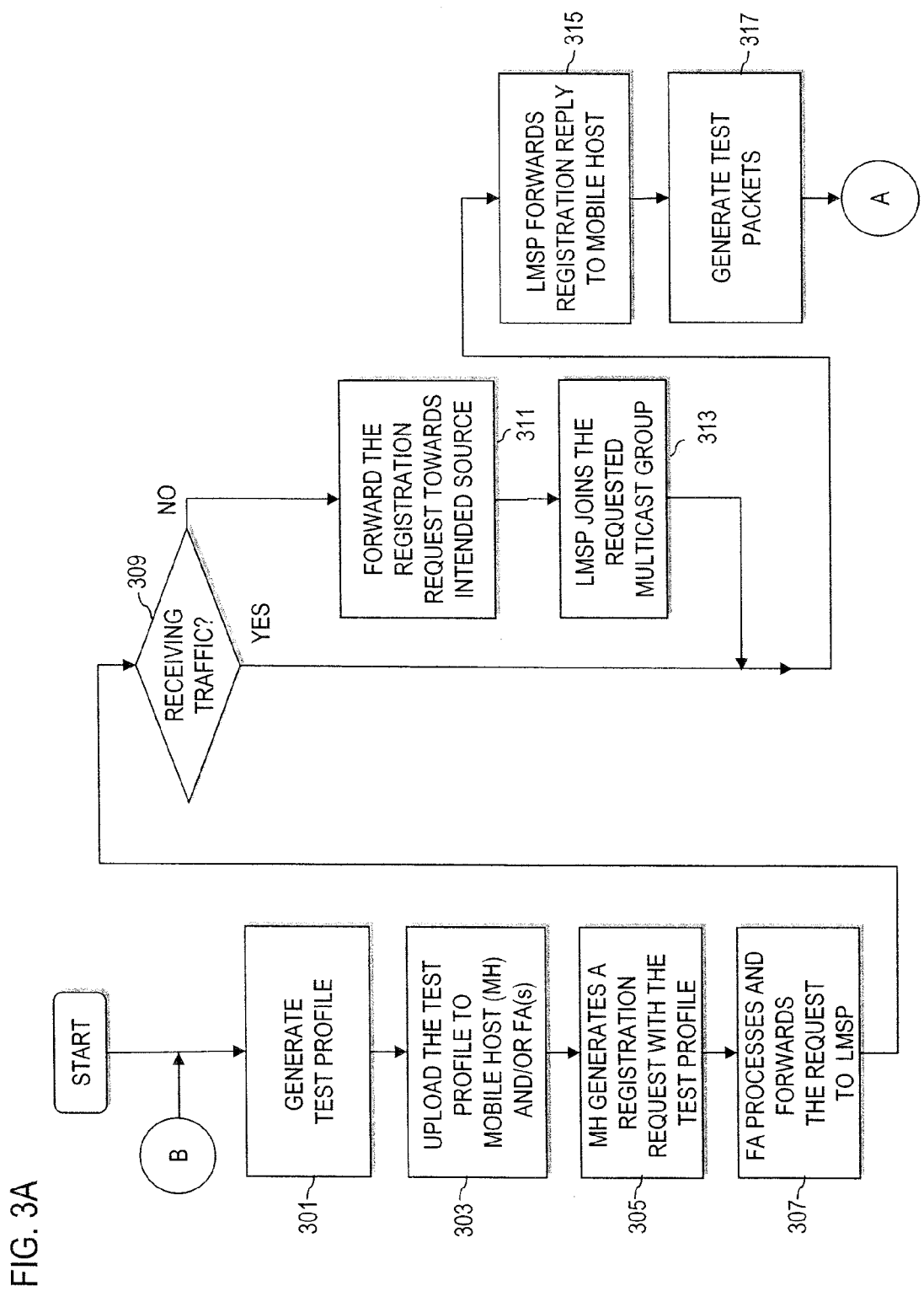

US 8,483,068 B2

SYSTEM AND METHOD OF PERFORMANCE MONITORING OF MULTICAST SERVICES WITH MOBILITY SUPPORT

BACKGROUND INFORMATION

Multicast technology has emerged as a viable and popular approach for supporting extended wireless communication services. For example, Internet Protocol (IP) multicast has been adopted as a technique for many-to-many communication over an IP infrastructure. It is expected that such services can be offered with different service level agreements (SLAs). Therefore, performance monitoring is important to maintain these different SLAs.

Traditional monitoring systems treats the network(s) between a source and a sink as one entity. Under this model, the system is capable of evaluating the performance as experienced between the measurement points, but has no visibility into the internal event of the network. As such, performance metrics can be readily correlated to the events. Also, with conventional approaches, extending performance evaluation sessions to a new segment requires adding a new instance of source and/or sink at the new point. Such configuration is characterized by a considerable overhead, and cost as well as presents scalability issues that may limit deployment. It is further recognized that traditional systems are not able to differentiate service degradation events resulting from network problems from those caused by mobility related events.

Therefore, there is a need for an approach for monitoring performance metrics in a multicast environment, while enhancing network visibility and scalability.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 3A and 3B are flowcharts of a testing process performed by the system of FIG. 1, according to various exemplary embodiments;

DETAILED DESCRIPTION

An apparatus, method, and software for providing performance monitoring in a multicast environment are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various embodiments are described with respect to Internet Protocol (IP) multicast and mobility aware systems, it is contemplated that these embodiments have applicability to other equivalent protocols and networking technologies.

Figure 1:
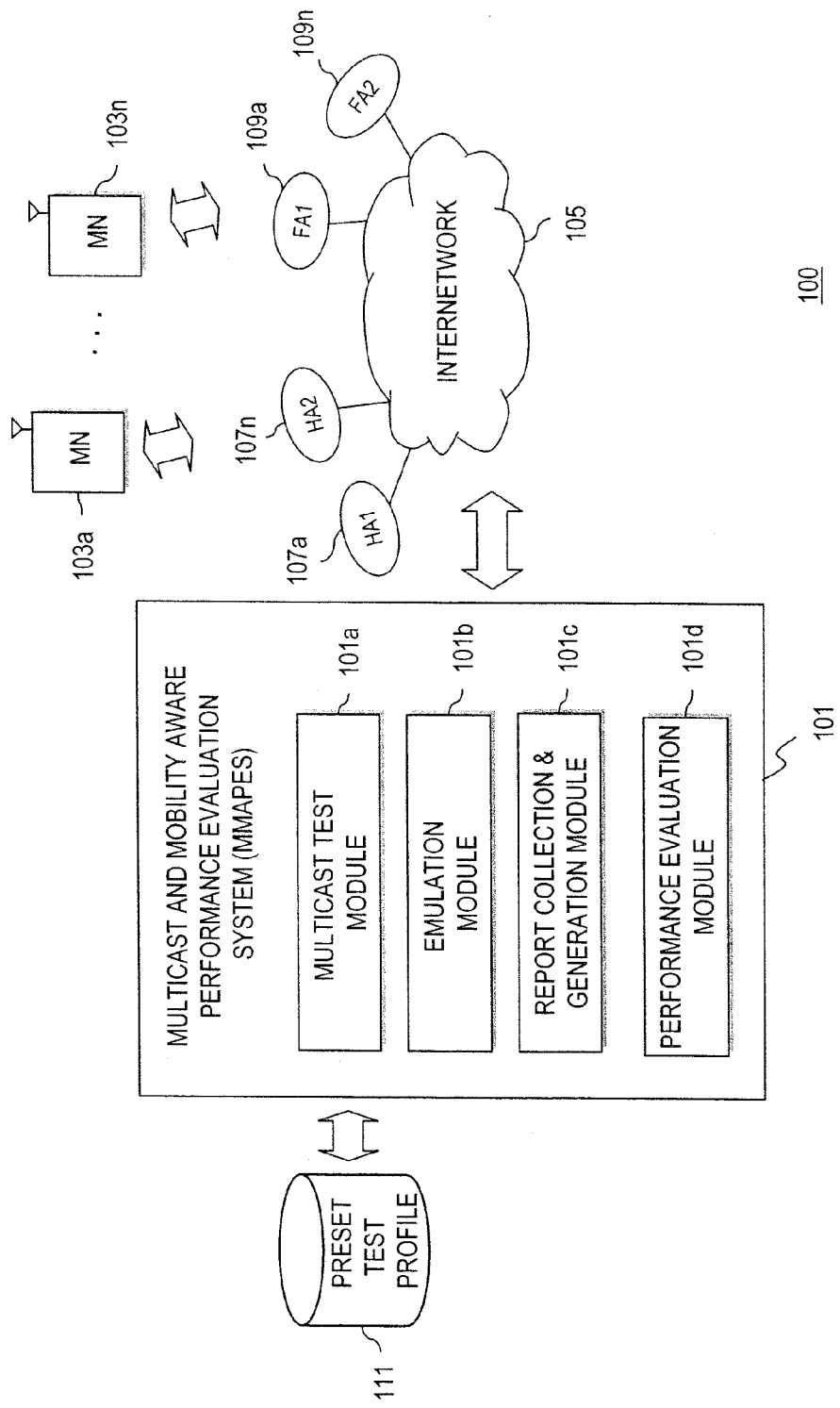
FIG. 1 is a diagram of a multicast and mobility aware performance evaluation system (MMAPES) capable of providing performance monitoring, according to an exemplary embodiment.

FIG. 1 is a diagram of a multicast and mobility aware performance evaluation system (MMAPES) capable of providing performance monitoring, according to an exemplary embodiment. It is recognized that, for example, support for multicast delivery is an essential element in providing services and features like IPTV (Internet Protocol Television), audio and video conferencing, content distribution, webcast, and distant learning applications using the Internet Protocol (IP) technologies. Another important element is to provide the same set of services to mobile hosts using IP.

A traditional IP multicast performance evaluation system is typically includes a source and one or more sinks The source's responsibility is to generate time-stamped multicast traffic, while the sink sends requests to receive data from specific multicast group(s). By inspecting messages that have been generated and received by the source and sinks, the system can provide information related to the performance. However, as noted, such conventional systems treat the networks between the source and the sink as a single entity, thereby lacking visibility within the networks.

A multicast and mobility aware performance evaluation system (MMAPES) 101 provides a mechanism to evaluate signaling and forwarding performance aspects in an environment that provides host mobility and multicast transport and distribution. Unlike the conventional systems, the system 101 is aware of and interacts with both mobility management and multicast support protocols, and thus, provides valuable information regarding the performance metrics associated with mobility and multicast events throughout the entire network(s). That is, performance aspects, such as the time needed to join and leave multicast a group, channel change time, and replication efficiency, can be evaluated. In addition, the system 101 can assess performance metrics (or parameters), such as packet loss, delay, jitter, etc. These performance parameters can correlate performance anomalies to specific mobility and multicast events, and can be applied on a per individual segment basis for both wired and wireless links. Such capabilities allow the system 101 to be used, for example, by service providers to monitor and audit network performance and optimize configurable network parameters. The system 101 can also be used by system developers to produce mobility and multicast aware evaluation and test tools, monitoring applications, and mobility/multicast protocol stacks with built in performance monitoring agents.

As shown, one or more mobile nodes (MN) 103 communicate over an internetwork 105. The terms mobile node (MN) and mobile host (MH) refer to a node that is capable of attaching itself to different networks; these terms, MN and MH, are used interchangeably to refer to a unit or device that is not fixed and is operated by a human user. The technology used for attachment to different networks includes wireless and/or wired media. Moreover, the capabilities of the system 101 described herein is transparent to the access technology used by the mobile node to connect to its service area. The internetwork 105 can include two or more networks, which may or may not employ similar communication protocols and equipment.

For the purposes of illustration, the system 100 employs IP multicast as the multicast technology. IP multicast is a technique for many-to-many communication over an IP infrastructure. This approach scales to a larger receiver population without requiring prior knowledge of who or how many receivers are present. This approach also utilizes network infrastructure efficiently by requiring the source to send a packet only once, even if the packet needs to be delivered to numerous receivers. The nodes in the network take care of the replicating the packet to reach multiple receivers only where necessary.

Key components of in IP multicast include an IP multicast group address, a multicast distribution tree, and receiver driven tree creation. An IP multicast group address is used by sources and the receivers to send and receive content. Sources utilize the group address as the IP destination address in their data packets. Receivers use this group address to inform the network that they are interested in receiving packets sent to that group. For example, if some content is associated with a multicast group having an address of 239.1.1.1, the source will send data packets destined to 239.1.1.1. Receivers for that content will inform the network that they are interested in receiving data packets sent to the group 239.1.1.1. Accordingly, the receiver "joins" 239.1.1.1. In an exemplary embodiment, the protocol used by receivers to join a group is the Internet Group Management Protocol (IGMP).

Once the receiver joins a particular IP multicast group, a multicast distribution tree is constructed for that group. An exemplary protocol that can be used for construction of the distribution tree is the Protocol Independent Multicast (PIM) protocol. This protocol can set up multicast distribution trees such that data packets from senders to a multicast group reach all receivers that have joined the group. It is noted that IP multicast does not require a source that sends data to a given group to know about the receivers of the group. The multicast tree construction is initiated by network nodes that are close to the receivers or is receiver driven. This allows for scaling to a large receiver population.

Therefore, IP multicast event support protocols that allow information to be distributed to different locations, without the need to send a separate copy of the same packet each addressed to the individual recipients.

Two tasks can be implemented to support multicasting. The first task involves a process that can be implemented to track group membership and to enable hosts to join and leave multicast groups. The second task is to route multicast datagrams within the network from the source to the recipients. As mentioned, IGMP can be used by hosts and routers to exchange multicast membership information, while schemes like Protocol Independent Multicast (PIM) and Core Based Tree (CBT) can be used to route multicast traffic through the network.

By way of example, the internetwork 105 can support multicast in Mobile-IP environments. Mobile-IP is an extension to the IP protocol that allows mobile nodes to continue to receive data (e.g., in form of datagrams, packets, etc.) wherever these nodes are attached to the internetwork 105. Additional control messages are introduced to allow involved nodes to manage their IP routing tables. The Mobile-IP protocol as described in Internet Engineering Task Force (IETF) Request for Comment (RFC) 3344 (which is incorporated herein by reference in its entirety), and the associated specifications, permit IP hosts to move between different subnetworks without the need to tear down the established transport layer sessions.

The mobility of the IP hosts is supported by two agents, Home Agents (HAs) 107 and Foreign Agents (FAs) 109. The home agent (HA) stores information about mobile nodes whose permanent address is in the HA's network, while the foreign agent (FA) 109 stores information about a MN 103 that is visiting its network. FIG. 1 shows two exemplary home agents, e.g., HA1 and HA2, and two foreign agents (e.g., FA1 and FA2). The Home Agent 107, among other functions, keeps track of the current location of the Mobile Nodes (MNs) that are being served by the particular Home Agent 107. According to one embodiment, each of the MNs 103 can have two addresses: a permanent home address, and a care-of address that is associated with the FA serving area.

To support multicast in the regional registration environment, two exemplary approaches are described: (1) HA subscription approach, and (2) FA subscription approach. The main characteristic that differentiates the two approaches is the element responsible for joining the multicast tree. In the HA subscription approach, the HA 107 joins the requested group and forwards the traffic to the FA 109 and the MN 103. With FA subscription, the FA 109 joins the multicast group and then forwards the traffic to the MN 103 either directly or through one or more intermediate FAs 109. If the MN 103 leaves its home network (HA) 107, the MN 103 signals the network such that multicast traffic is forwarded to the new serving area.

It is noted that in addition to a current FA, a root FA or another intermediate FA can join the multicast group. The term LMSP (Local Multicast Service Provider) refers to a FA that can be selected, based on a specific criteria, to join the requested multicast group(s).

As shown, the MMAPES 101 includes various modules for evaluating IP multicast signaling and forwarding performance. Such evaluation process can be executed either on demand or at predetermined intervals. The MMAPES 101, in an exemplary embodiment, does not use external probes; instead the system 101 interacts with multicast and mobility support protocols. By way of example, the system 101 includes a multicast test module 101a, an emulation module 101b, a report collection and generation module 101c, and a performance evaluation module 101d.

The MMAPES process generates multicast test traffic, via the multicast test module 101a, according to a preset test profile 111, which can be determined by a user of the MMAPES 101—e.g., service provider or service customer. According to an exemplary embodiment, a MMAPES typical test profile 111 is enumerated in Table 1.

TABLE 1

| PRESET TEST PROFILE |
|---|
| Multicast addressing profile (sources, multicast group addresses) |
| Mobility multicast mode (LMSP, GFA, HA) |
| Mobility multicast submode (LMSP selection mode) |
| MN profile (actual MN, emulated MN, emulated mobility profile which includes FAs responsible for emulation) |
| Transport Protocol type and port number |
| IP header information: Type of service or Differentiated service bits value. |
| Do_NOT_Fragment flag (set, not-set) |
| Packet length |
| Trigger for test termination: Duration, number of packets, number of mobility events |

TABLE 1-continued

PRESET TEST PROFILE

Transient allowance: Time (in seconds) for which the system will wait to allow packets to reach destination before compiling local reports
System resource monitoring: When this option is enabled the MMAPES will keep track of additional information associated with resources availability on the mobility agents and on the mobile node.

The multicast test module 101a supports multiple modes of operation depending on whether multicast traffic is generated internally or externally. For example, in the first mode (denoted "Test M-Group mode"), in which the MMAPES 101 is responsible for generating the multicast traffic needed to implement the test session, this type of testing mode represents an active mode of operation. Secondly, in a "Global M-Group mode," the MMAPES 101 evaluates the performance in an environment where multicast traffic is generated by sources that are external and not controlled by the MMAPES 101. Another mode of operation is related to the MN nature. From the mobility nodes aspect of operation, the system can work in one of two modes. In the first mode, the system performs performance monitoring using actual MNs. In the other mode, the system utilizes simulated MNs to imitate cases hard to replicate using actual MNs. The two MN modes can be combined in the same test in a hybrid fashion (some MNs are actual MNs, while the other are simulated).

In one embodiment, with respect to signaling, the MMAPES 101 utilizes the following control messages (as specified in the RFC 3344): the Registration Request and the Registration Reply messages. These messages are used for standard Mobile-IP, and to support multicast—as described in "Multicast Support for Mobile-IP with the Hierarchical Local Registration Approach," August 2000, H. Omar, T. Saadawi and M. Lee; which is incorporated herein by reference in its entirety. Such messages can be extended using a long extension format to carry the information needed for the MMAPES performance test. The MMAPES 101 utilizes registration messages extensions to embed the control information needed to support the system 101. With regard to data encapsulation, a tunneling mechanism like GRE (Generic Routing Encapsulation) can be used. The MMAPES 101 needs to keep track of individual packets while traveling in the regional registration domain in order to evaluate performance aspects like packets loss, control and data delay and jitter.

Alternatively, the use of protocol extensions can be substituted with visibility to some information associated with the states of the multicast and mobility support protocols. This is an available option when bundling the performance evaluation support within existing protocol stacks is not preferred. It is assumed that multicast can be supported in the mobility environment using LMSP approach, which is further described in the "Multicast Support for Mobile-IP with the Hierarchical Local Registration Approach." If other approaches are utilized, the MMAPES 101 can adjust its internal operation to accommodate for the particular approach.

Figure 2:
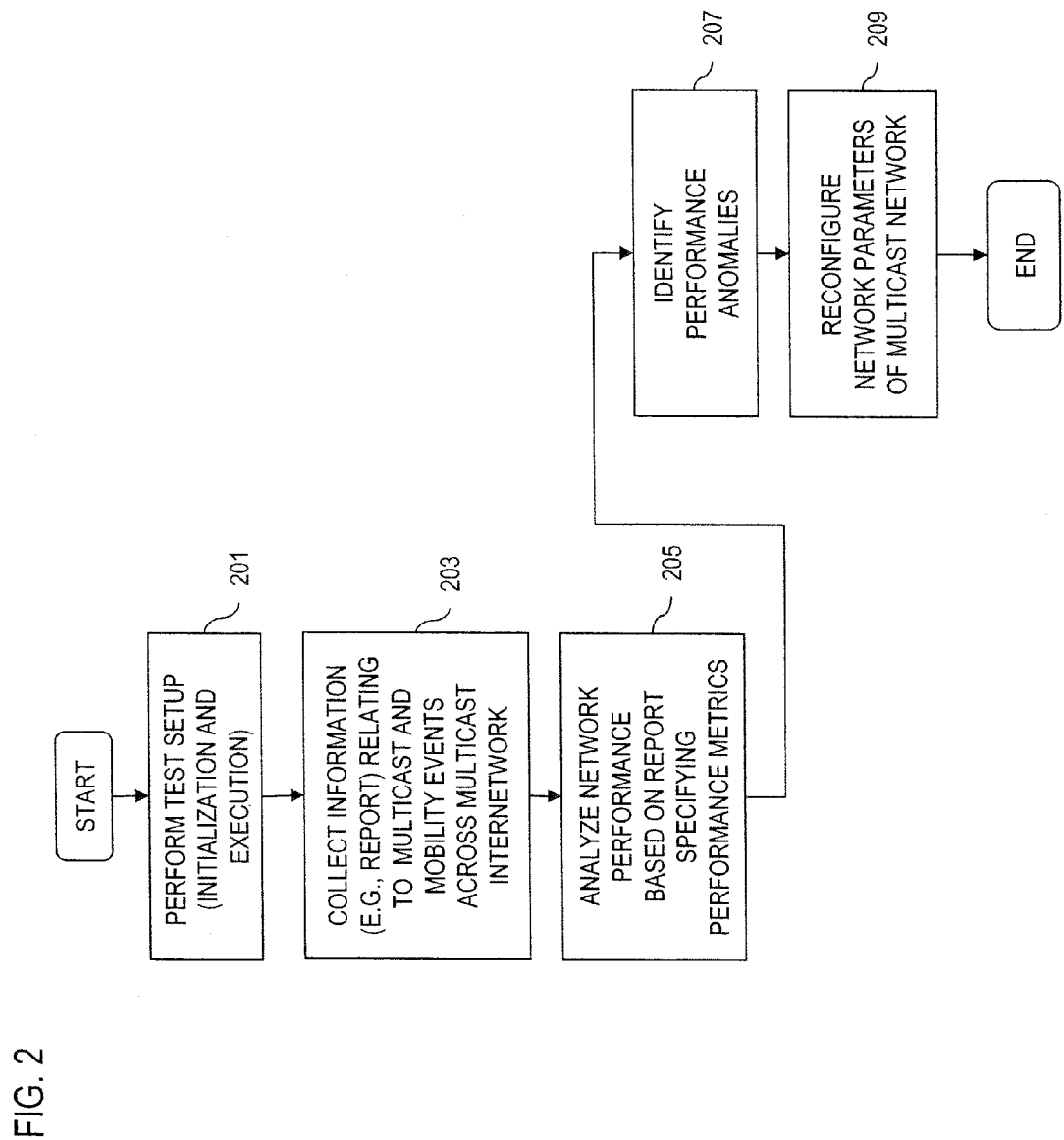
FIG. 2 is a flowchart of a process for evaluating performance of multicast and mobility events, according to an exemplary embodiment.

FIG. 2 is a flowchart of a process for evaluating performance of multicast and mobility events, according to an exemplary embodiment. In step 201, the system goes through the setup and initialization phase, followed by execution of the test. In step 203, the system 101 collects information (e.g., in form of reports from the network elements that provide transport of the multicast data) relating to multicast and mobility events across the multicast internetwork 105. The events, as mentioned, can relate to joining and leaving a multicast group, the channel change time, and performance of replication efficiency.

In step 205, the system 101 analyzes the events to determine network performance based on the collected reports.

The system 101 also, per step 207, identifies performance anomalies associated with the multicast and mobility events. In step 209, the analysis can then be used to reconfigure the multicast network for better performance. The above testing and analysis procedures can be subsequently performed to reconfigure the network.

Figure 3B:
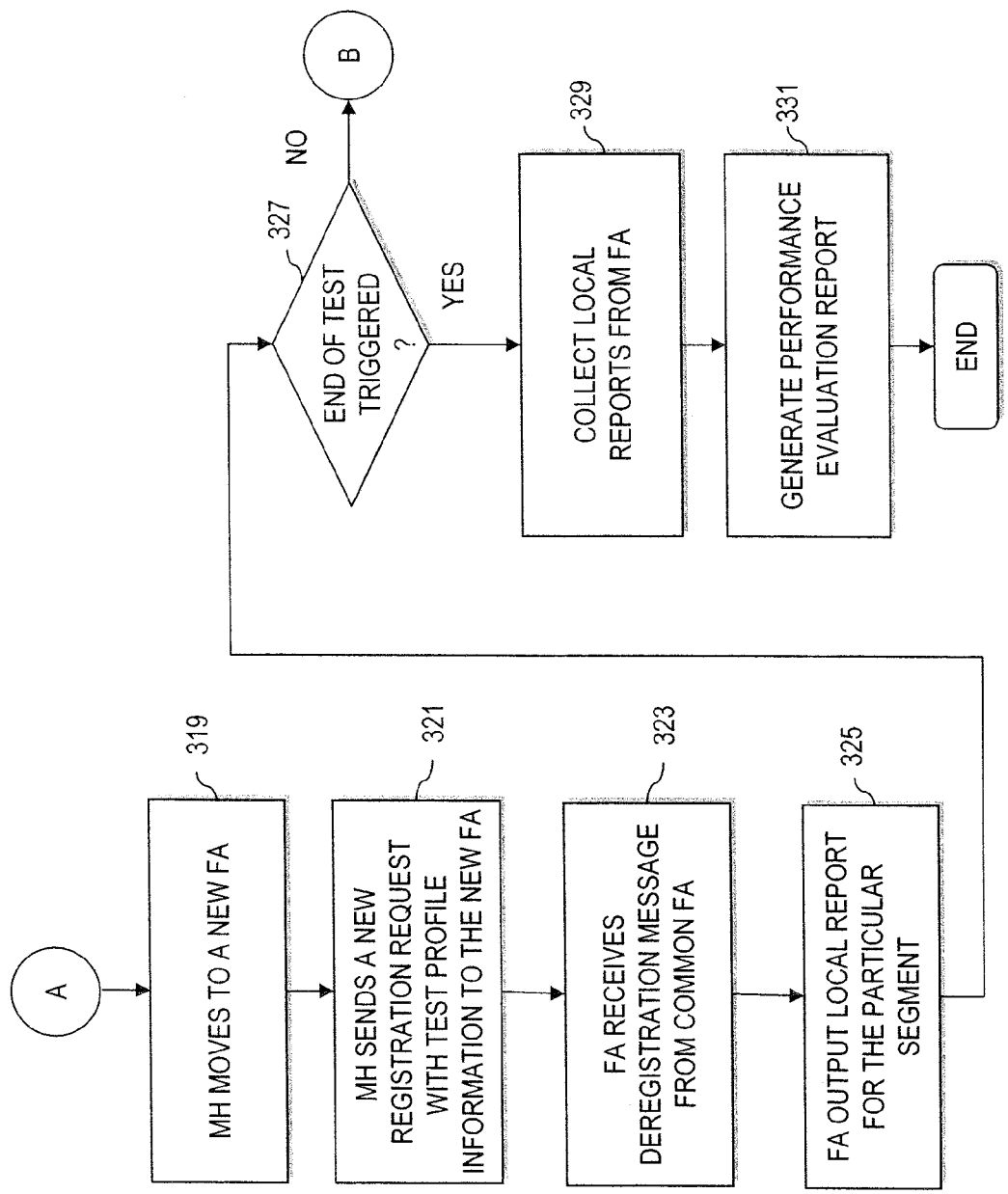

FIGS. 3A and 3B are flowcharts of a testing process performed by the system of FIG. 1, according to various exemplary embodiments. For the purposes of illustration, a typical test session is described. In step 301, the MMAPES 101, per the multicast test module 101a, generates a test profile 111. Per step 303, the test profile 111 is uploaded to the MH 103, and/or to the FA(s) 109 if using emulated MN 101 mode. Having MNs in both actual and simulated modes in the same test is a valid option. In step 305, the MH 109 generates a Registration Request with MMAPES extension (the extension will include information regarding the test profile 111). In particular, the test profile 111 indicates the requested multicast group(s).

In step 307, the FA 109a process and forward the Registration Request to a LMSP (Local Multicast Service Providers)—i.e., root FA 109n, for example. Next, the LMSP 109n checks the requested multicast source and the requested group. If the LMSP 109n is already receiving the traffic (as determined in step 309), no additional action is required (global multicast mode). If the LMSP 109n is not receiving the traffic, then the LMSP 109n forwards, as in step 311, the registration request towards the intended source. This forwarded request is modified such that it acts basically as a trigger for the multicast source. In step 313, the LMSP 109n joins the requested multicast group.

The LMSP 109n processes and forwards the Registration Reply to the MH (step 315). It is noted that each intermediate FA creates the appropriate structure to maintain the test session state. In step 317, the multicast source starts generating packets for the requested group (per the test profile 111). This test packet generation process is more fully described in FIG. 4.

As seen in FIG. 3B, upon the mobile host 103 moving to a service area managed by a new FA 109, as in step 319, the MH sends a new registration request with the MMAPES extension to this new FA 109 (step 321). When the previous FA 109 receives a deregistration message from the common FA 109, per step 323, the FA 109 can start processing the current existing state and output a local report, as in step 325, for this segment of the test session. It is noted that the mobile host 103 can revisit the same FA 109 during the same test session; in such case, the FA 109 will keep a new state for the new test segment.

In step 327, it is determined whether the end of the test is triggered. If this is the end of the test session, local reports are collected by the report collection generation module 101c from the FAs 109 (step 329). Thereafter, a performance evaluation report is produced, as in step 331.

Returning to the decision step of 327, if the end of the test is triggered, the prior steps of 301-327 are repeated.

Figure 4:
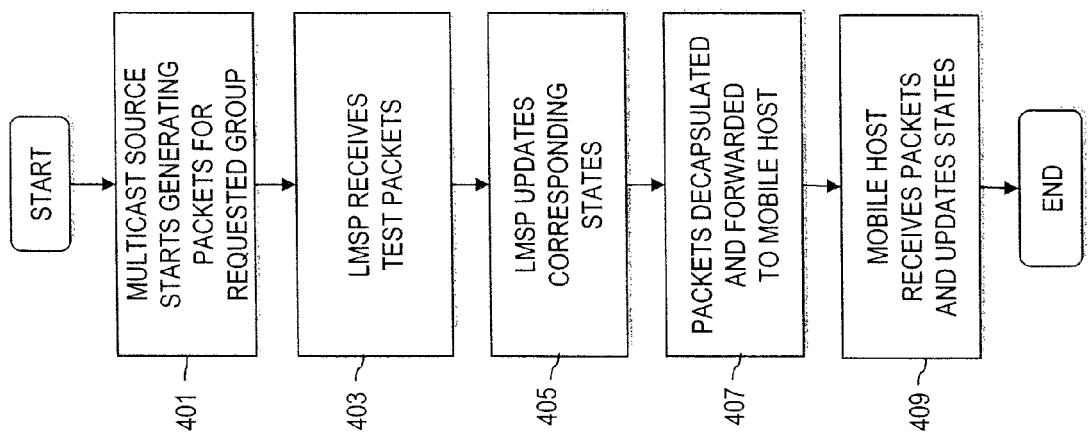
FIG. 4 is a flowchart of a process for generating test packets, according to an exemplary embodiment.

FIG. 4 is a flowchart of a process for generating test packets, according to an exemplary embodiment. This test packet generation process involves the multicast source generating packets for the requested group according to the test profile 111, per step 401. Upon receiving these packets, the LMSP 109n updates the corresponding test states (steps 403 and 405). Thereafter, in step 407, the packets are decapsulated and forwarded towards the mobile host. Upon 409, the mobile host receives the packets, in which the corresponding states are updated.

Returning to the example of FIG. 1, according to an exemplary embodiment, the multicast test module 101a, in conjunction with the preset test profile 111 (as provided in Table 1) can specify the triggering event that can terminate the test. Among the available test options, test duration, number of generated test packets, or the number of mobility events can be included. The preset test profile 111 may specify a single option or a logical combination of those options. The MN 103 is the element that can specify the trigger the test termination, while other options are available.

To terminate the test session successfully, a number of transactions are completed through the multicast test module 101a. The MN 103 will need to send a Report Query message to the test multicast source (and will be intercepted in transit by, for instance, the FA 109a). If global multicast mode is used, the multicast source is irrelevant in terminating the session. The purpose of the Report-Query message is to trigger the elements involved in this test to start terminating the corresponding processes and to start compiling the local reports. The elements will wait a period of time to accommodate for packets in transient, as specified in the test profile 111.

Each element can then generate its local report and package the report in a Report-Response message to the report collection and generation module 101c (also denoted as a "collector"). The report collection and generation module 101d inspects and compiles the Report Response messages received from the different elements. After verifying the received reports, the report collection and generation module 101c triggers sending a Resource_Release message that permits recipients to clear and restore resources that were dedicated for this test session. The Report Query, Report-Response and the Resource_Release messages are associated with the MMAPES 101 and can be generated on demand. All the FA(s) 109 and HA(s) 107 that are involved in the test session (if applicable) are included in this process.

According to an exemplary embodiment, the report collection and generation module 101c is responsible of collecting result reports from the different elements involved in a MMAPES session. This functionality can be supported on any one of the network elements supporting Mobile-IP, such as the root FA 109n, or can be the responsibility of a dedicated element. The collector is identity is defined in the test profile 111. After collecting the local reports from the mobile node and the FA(s) 109, the report collection module will start processing and analyzing the collected information.

The performance evaluation module 101c evaluates performance metrics, e.g., measurement related to the time needed to join and leave multicast group. The preset test profile 111 can also specify a group change pattern, which is useful in evaluating the channel change time associated with such communication services as IPTV and video on demand. The MMAPES system 101 is capable of analyzing the collected information and identifying each individual link contribution to the performance. These types of measurements can be used to predict customer experience and assist with troubleshooting issues related to group management. This is also useful in comparing different design options, for example, when selecting between different multicast subscription modes. According to an exemplary embodiment, a basic approach is provided to time stamp the membership report on the different network elements and to correlate those timestamps with the corresponding data multicast frames.

According to an exemplary embodiment, a performance test session can be scheduled by the user (e.g., service provider user or customer user). The MN 103 should be able to support both modes. To support provider-scheduled mode, the provider needs to instruct the MN 103 with its plan regarding the test session and the corresponding information. This can be performed using the next available registration reply to the MN 103 with the appropriate extension. The current MN 103 location information (the current root FA 109) is made available at the HA 107. The test trigger can be initiated by the HA 107, and then forwarded to the appropriate root FA 109. From there, it is forwarded downstream to the MN 103. After receiving such reply, the MN 103 extracts the test session information and start the test accordingly. According to an exemplary embodiment, for customer scheduled test mode, the user (customer) configures the MN 103 (through the use of a graphical user interface, command line interface or any other appropriate method) with the information related to the performance test session and its profile.

After the test schedule is identified, the MN 103 creates the appropriate structure to keep track of data related to the performance session. The MN 103 sends a membership report on the appropriate time. The MN 103 eventually starts to receive the requested multicast traffic. It is possible also that the MN 103 moves to a new service area. Exemplary state information is as follows:

TABLE 2

Test Session ID
    Performance monitoring session identifier
TX_MR_MMAPES
    A structure that keeps track of membership reports sent to the FA. It includes the timestamp for generated reports, the requested multicast groups
RX_Seq_Num
    A structure that keeps track of received multicast data packets and includes time stamps, the sequence number and the multicast group.

According to various exemplary embodiments, the FA 109 supports the following operations. When forwarding the membership report (MR) towards the LMSP, the intermediate FA 109 processes the MMAPES extension and creates the appropriate structures. The FA 109 keeps track of MRs forwarded upstream as well as multicast packets received from upstream or from the Multicast Delivery Tree Joining Points (MTJP) and of the sequence number for multicast packets forwarded downstream. The FA 109 further tracks the event of a MN 103 moving away from the service area when it is the last member of a particular group, and of when the corresponding multicast traffic stops arriving at this FA 109.

If working in the Test M-Group mode, the FA 109 can act as a source for multicast traffic per the corresponding multicast test profile 111. The FA 109 can start generating the corresponding multicast traffic as instructed by the profile 111. Depending on the FA 109 that is intended to act as the test multicast source, the FA 109 handles the membership report (MR) differently. According to one embodiment, if the intended source is the LMSP, the FA (acting as the LMSP) does not need to forward the MR upstream. If the LMSP is not the intended source, the FA 109 forwards the request to the intended multicast source (as identified in the test profile 111).

Moreover, the FA 109 supports the MN 103 emulation mode. In some situations, it may be desired to emulate a mobility pattern with special characteristics without having the actual MN(s) 101 in the network. Possible application of this mode is pre-deployment testing and performance evaluation. Scalability testing where it is difficult or not practical to provide the requested number of MNs 101 is another application of this mode of operation.

An example of state information that can be maintained is as follows:

TABLE 3

RX_MGroup_ID_Seq_Num
   A structure that keeps track of the sequence number of packets received for a multicast group
FWD_Mgroup_ID_Seq_Num_to_FA
   A structure that keeps track of the sequence number of packets forwarded downstream to a FA for a multicast group
FWD_Mgroup_ID_Seq_Num_to_MN
   A structure that keeps track of the sequence number of packets forwarded to MN for a multicast group
TX_Mgroup_MR
   A structure that keeps track of membership reports sent upstream. It includes the timestamp for generated reports, the requested multicast groups
RX_Mgroup_MR
   A structure that keeps track of received membership reports. It includes the timestamp for received reports, the requested multicast groups The HA 107 contribution to the MMAPES 101 involves the case when HA 107 subscription is being used. In this case, the root FA 109 will receive the multicast traffic from the HA 107. The HA 107 tracks the time when a join request has been sent to the MTJP, and when multicast traffic starts to arrive and forwarded to the root FA 109. An example of such state information is as follows:

TABLE 4

Figure 5:
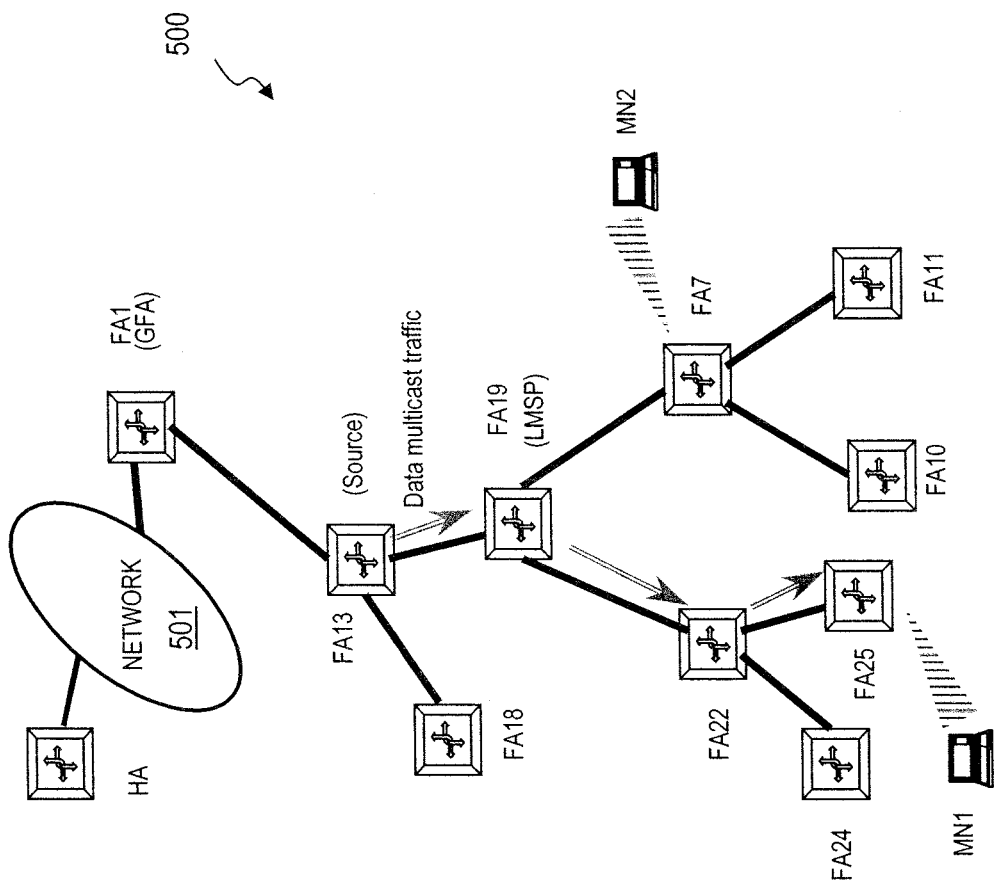
FIG. 5 is a diagram of a regional registration and multicast process, according to an exemplary embodiment.

TX_Mgroup_Join
   A structure that keeps track of generated membership reports.
   It includes the timestamp for generated reports, the requested multicast groups
RX_Mgroup_MR
   A structure that keeps track of received membership reports.
   It includes the timestamp for received reports, the requested multicast groups
RX_MGroup_ID_Seq_Num
   A structure that keeps track of the sequence number of packets received for a multicast group
FWD_Mgroup_ID_Seq_Num_to_FA
   A structure that keeps track of the sequence number of packets forwarded to a root FA (or a FA) for a multicast group FIG. 5 is a diagram of a regional registration and multicast process, according to an exemplary embodiment. An efficient multicast delivery mechanism attempts to forward packets to all intended recipients using the minimum number of duplicate packets. A communication system 500 maintains state information on the different network elements HA, FA1, FA13, FA 18, FA19, FA22, FA24, FA25, FA7, FA10, FA11, MN1 and MN2, thereby permitting the evaluation of network performance metrics. According to an exemplary embodiment, the system 500 evaluates the cost by keeping track of datagrams and the corresponding duplicates on each node, HA, FA1, FA13, FA 18, FA19, FA22, FA24, FA25, FA7, FA10, FA11, MN1 and MN2, and assigns a cost to each link the datagram travels over. By aggregating the cost associated with multicast datagram, a total cost value can be determined; such value, in an exemplary embodiment, can be proportional to the number of duplicates and the cost of traversed links.

The system 500 represents a regional registration mobile-IP environment, in which a network 501 provides communication between the HA and FAs. For the purposes of illustration, the MN1 is currently in the service area of FA25; at this point, the user decides to run a performance evaluation session, whereby the test profile 111 specifies that the source for the test multicast data traffic G1 (Group 1) is FA13 (Test Group mode). The profile also specifies an LMSP subscription scheme with regional domain topology (thus causing FA19 to act as the LMSP).

As shown, another MN (e.g., MN2) resides in the service area of FA7, in addition to the one existing within FA25. By way of example, a test session involves 10 multicast packets with FA13 as the source for G1. It is also assumed that a cost of 10 is assigned to all wired links, except of one between FA22 and FA25, which is assigned a cost of 15. According to one embodiment, a wireless link is assigned a cost of 25. Table 5 enumerates the cost of delivery of data (e.g., first packet sequence 1).

TABLE 5

| Cost of Delivery Packet Sequence |
|---|
| Cost on FA13-FA19 is 10 |
| Cost on FA19-FA22 is 10 |
| Cost on FA19-FA7 is 10 |
| Cost on FA22-FA25 is 15 |
| Cost on FA7-wirless is 25 |
| Cost on FA25-wirless is 25 |

After summing the individual cost components, the total forwarding cost for the packet sequence 1 is 95. Other sequences can be similarly evaluated. Such capability allows use of the MMAPES 101 for providing performance comparison between multiple designs. For example, if a new network configuration suggests assigning LMSP functionality to FA22 instead of FA19, this may lead to a different cost value. The cost assigned to the different links is configured by the provider and can correlate to available bandwidth, for example. Actually the MMAPES 101 provides the building blocks (number of duplicates, link ID traversed by packets, correlation to signaling events) that can be used as an input to a cost formula, which is, for instance, designed and maintained by the service provider.

Figure 6:
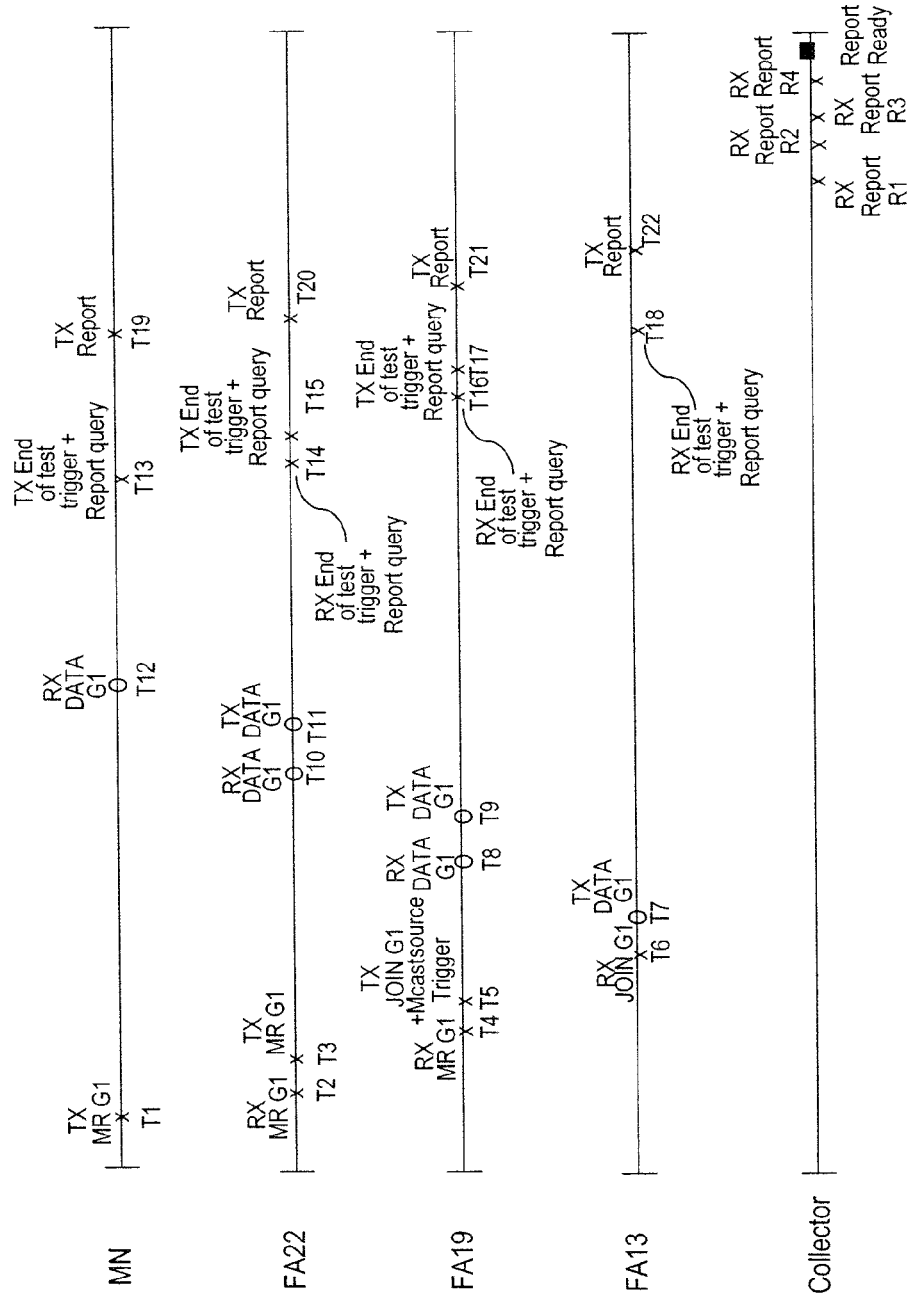
FIG. 6 is a diagram showing group management membership performance, according to an exemplary embodiment.

FIG. 6 is a diagram showing group management membership performance, according to an exemplary embodiment. Continuing with the example of FIG. 5, a time line is depicted for generating and collecting the reports. In this example, channel change time is defined as the time difference between when a MN 103 sends a request to receive specific multicast group traffic and when the first corresponding packet is received. It is contemplated that the requests can be sent in sequence and within a relatively short period of time. As shown in FIG. 6, the time difference between T12 and T1 is represented. During this period, the request is processed by the FA22, FA19 and FA13. Specifically, at time T2 and T3, the FA22 processes the membership report and sends it to FA19, which receives the report at T4 and sends a Join message to the FA13 at T5. During the interval (T6-T7), the FA13 receives the Join message and responds to the FA19 with the transmission of the requested multicast data. This data is passed to the FA19 and then to the FA22 during times T8-T11.

Next, the network elements, MN 103, FA22, FA19 and FA13, initiate performance monitoring to generate the corresponding reports (R1, R2, R3 and R4) during the time interval (T13-T22). These reports R1, R2, R3 and R4 are forwarded to a collector 601. In this scenario, the test profile 111 can include multicast profiles that instruct the MN 103 to send requests emulating a particular channel change time. The channel change time is evaluated for every change and results are included in the final report.

According to an exemplary embodiment, a useful performance metric is forwarding delay, which is evaluated on each of the intermediate FA(s); such metric can be captured in the membership report. For example, if a user has complained about a relatively high value for the channel change time, the provider needs to identify which link or network element is responsible for the delay. A relatively large value for the time interval (T3-T2) may indicate a high CPU (central processing unit) utilization on the FA22, while a large value for the time interval (T4-T3) may point to a propagation or congestion management issue.

Figure 7:
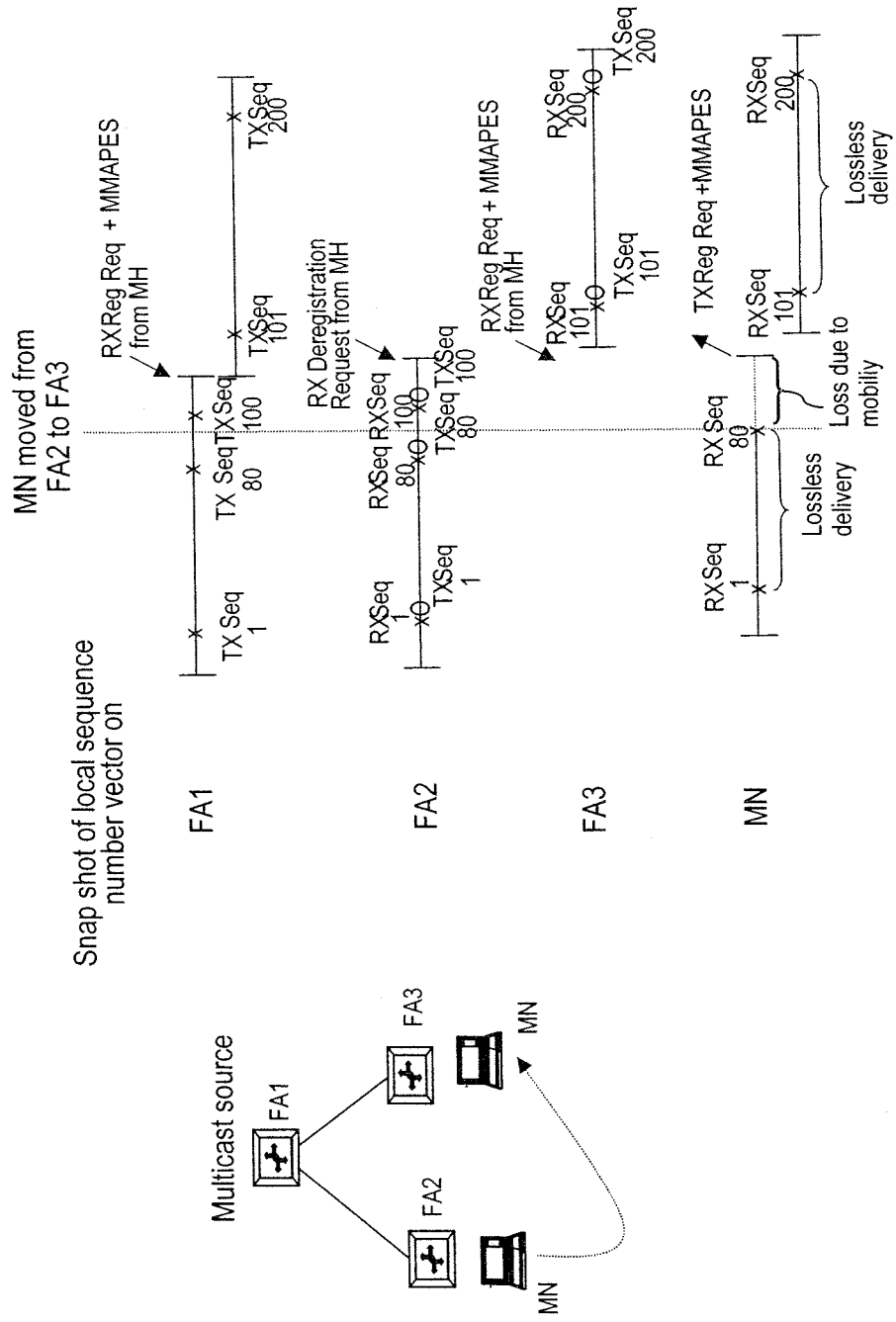
FIG. 7 is a diagram of a process for detecting multicast packet loss due to mobility, according to an exemplary embodiment.

FIG. 7 is a diagram of a process for detecting multicast packet loss due to mobility, according to an exemplary embodiment. Multicast packets are not delivered to the MN 103 when it moves to a different service area. In this example, the MN 103 moves from a coverage area served by FA2 to other area covered by FA 3. To restore the service, the regional FA(s) need to adjust the local tables to correctly deliver the packets to the new location of the MN 103. The number of undelivered datagrams due to mobility events depends on the amount of time needed to complete the process of updating the tables. Another source of undelivered packets, that is specific to the HA subscription approach, is that the primary HA may select to stop forwarding datagrams in the case where none of its MNs is currently residing in the region served by a root FA.

According to an exemplary embodiment, the process of FIG. 7 differentiates between multicast packet loss due to mobility events, and those attributed to other reasons. By way of example, the MN 103 triggers the test start while being serviced by FA2. The MN 103 then moves to FA3 where the MN 103 remains before terminating the test. When the end of test trigger is generated, the report collection and generation module 101d will eventually receive the local reports from the MN 103, FA1, FA2 and FA3. FIG. 7 illustrates exemplary information included in the TX/RX sequence number vector, which is one of the components of the local reports.

Tables 6 and 7 represent a report sample:

TABLE 6

Test Start time: 5/10/2006 11:37:10.2400
Test End time: 5/10/2006 11:47:11.3400
Multicast support mode: LMSP
Mobile Node Emulation: Disabled
Multicast Profile:
    Test multicast source: enabled
    Transport Protocol: UDP
    Source multicast; 192.168.20.1
    Multicast group: 234.1.1.10
    Packet length: 256 bytes
    IP Precedence: 4
    Join delay report threshold: 400 msec
    Leave delay report threshold: 1000 msec
    Mobility Profile: Disabled
    Test Termination: Duration 600 seconds

TABLE 7

Results:

Average on: 2 time segments
Avg Rate evaluated at the source 192.168.20.1
(egress port - Group 234.1.1.10): 0.13 Mbps
Max Rate evaluated at the source 192.168.20.1
(egress port - Group 234.1.1.10): 0.25 Mbps
Throughput evaluated at the destination 10.1.1.1
(ingress port - Group 234.1.1.10): 0.11 Mbps
Throughput segment 1 (FA1 to FA2)= 0.13
Throughput segment 2 (FA2 to MN)= 0.11
Packet Loss due to mobility= 0.2 %
Non-mobility related packet loss=0.0%
Binding mismatch events=0, Mismatch duration=0.0 msec
Time segment 1, FA: FA2
Packet Loss= 0.7 %
Avg Delay= 55 msec
Avg Jitter= 6 msec
Join delay propagation and processing (MN-FA2):
within threshold
Join delay propagation and processing (FA2-FA1):
within threshold
Time segment 1, FA: FA3
Packet Loss= 0.0 %
Avg Delay= 85 msec
Avg Jitter= 6 msec
Join delay propagation and processing (MN-FA2):
within threshold
Join delay propagation and processing (FA2-FA1):
within threshold Inspecting the received sequence number vector (from the MN 103) included in the mobile node local report, the report analysis process detects a packet loss window of a trailing time stamp that coincides with the event of the mobile node sending a Registration Request with MMAPES extension. The analysis process, which resides in the evaluation module 101b (of FIG. 1), verifies that the Registration Request has a different ID from the previous one (to avoid interpreting a renewal or retransmitted Registration Request as a mobility event). Inspecting time stamps in the backward direction of the time line, the analysis process identifies the first packet sequence number, in this contiguous loss window, that is associated with the particular mobility event. In this example, the sequence numbers from 81 to 100 correspond to the mobility event packet loss. The loss can be attributed to the time needed to update local databases on FA1 to include the port leading to FA3 as another recipient of G1 multicast traffic.

The evaluation module 101b then continues to inspect the remaining of the received sequence number vector. If the local reports reflect mobility events, the results are partitioned into segments, wherein each segment corresponds to a single visit to a FA 109. The module 101b inspects each time segment and interprets any packet loss other than the one detected at the end of the segment as non-mobility associated loss.

According to various exemplary embodiments, different environments are characterized by various topologies and different requirements. In the following description, it is explained how the MMAPES 101 can be applied to different environments.

For example, one scenario (Case 1) involves implementation of MMAPES with different variations of multicast support in a regional registration Mobile-IP environment. As discussed above, the approach has been explained with respect to the LMSP subscription mode; however, other configurations are contemplated (e.g., GFA or HA). If either the GFA or the HA subscription approach is being used, the system 101 works using the same basic concepts with the following considerations. If the HA subscription mode is used, the HA is involved in the multicast support and in the MMAPES process—similar to the FAs. The HA is capable of keeping states for the number of MNs supported by this HA. In fact, the HA not need keep MMAPES states for each individual MN. This is the case since the GFA will be able to forward multicast traffic for groups which it is already a member in, without the need to request the traffic from another HA. In this mode, the HA also provides the local report to the collector (i.e., module 101*c*).

In other case (i.e., Case 2: Encapsulation), when using the test group mode, a sequence number to identify multicast data packets is embedded in the payload. When running the performance evaluation session in the global multicast mode, the system 101 attempts to interact with an existing multicast group that is not dedicated for the MMAPES process, and thus cannot manipulate the payload. One option is to use a type of encapsulation that supports sequence number. For example the GRE encapsulation can be used. The FA can create a GRE tunnel (one for each multicast group) to tunnel multicast traffic down stream, with the other end of the tunnel terminating on the downstream FA. The sequence number in the header is correlated with multicast packet sequence number to track the number of packets between the tunnel end points.

In a third scenario (Case 3), this environment provides for implementation of the MMAPES as an application. The earlier description of MMAPES considered the integration of certain control messages within the existing mobility multicast protocol; this arrangement provides maximum efficiency and minimum overhead. However, in some situations, it may be desirable to keep the performance monitor implementation separate from the existing mobility and multicast support protocols, as to facilitate the development activities by different entities. To accommodate this option, the MMAPES functions can be implemented as an application level process, which can generate its own control messages exclusively.

Figure 9:
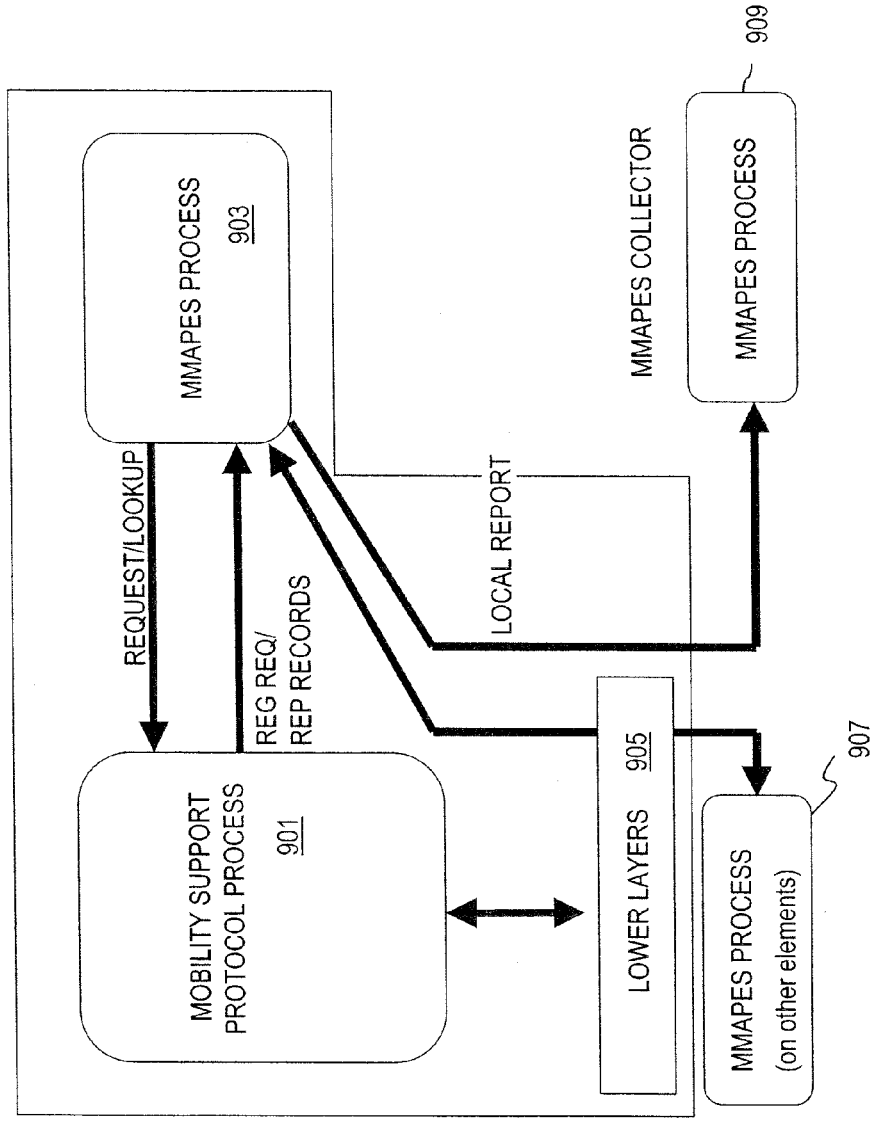
FIG. 9 is a diagram of a process for inspecting packets associated with mobility and multicast support, according to various exemplary embodiments.

When implementing MMAPES as an application, two approaches are available to provide the needed mobility/multicast signaling information. Firstly, the MMAPES process can query, through an interface, the multicast and mobility support for information related to mobility and multicast support. This approach is discussed below. If the interface between MMAPES and the multicast/mobility support protocols is not available, then another approach is to inspect the corresponding signaling message in a passive mode. This approach is illustrated in FIG. 9.

Figure 8:
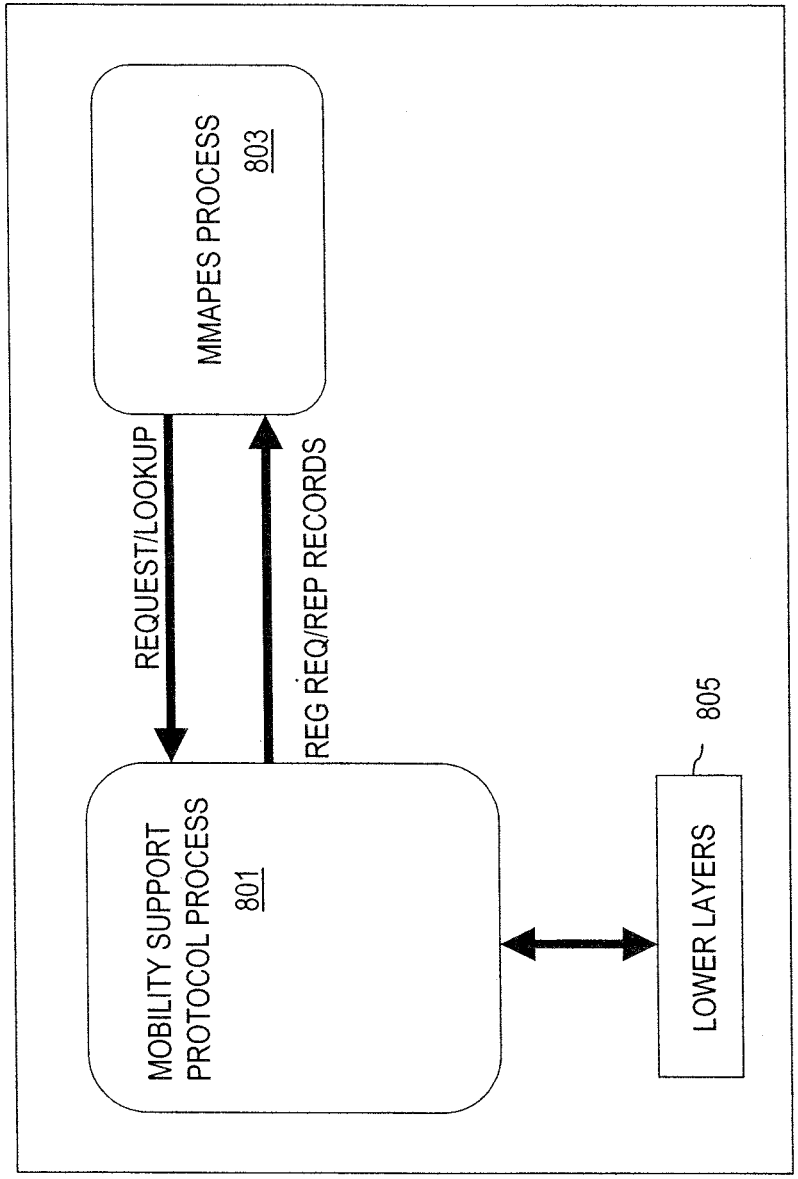
FIG. 8 is a diagram of a process for extracting mobility events related information, according to various exemplary embodiments.

FIG. 8 is a diagram of a process for extracting mobility events related information, according to various exemplary embodiments. In this example, a mobility support element 800 includes a mobility support protocol process 801 and a MMAPES process 803. The element 800 can be a home agent, foreign agent, or mobile node. The MMAPES process 803 extracts mobility events related information of an MN by interfacing to the multicast and mobility support protocol state. According to an exemplary embodiment, the MMAPES process 803 on the different mobility support elements has visibility into information associated with the state of the mobility and multicast support protocol process 801, which interacts with lower layer protocols 805.

By way of example, the following information is needed on each MN, FA and HA. Table 8 lists exemplary information on the mobile node (MN), and Table 9 corresponds to the FA. Table 10 provides information for the HA. The information is needed to generate the local reports, which depend on information related to the mobility events.

TABLE 8

| MN |
|---|
| Current FA IP address |
| HA IP address |
| Time stamped records for the generated and received registration requests and replies. |
| A mobility event notification towards the MMAPES process. |

TABLE 9

| FA |
|---|
| IP address for MNs currently being serviced by the FA |
| Time stamped records for the processed registration requests and replies |
| Time stamped records for the processed deregistration messages |
| Time stamped records for the processed multicast report and join/leave requests |

TABLE 10

| HA |
|---|
| IP address for MNs serviced by this HA |
| Time stamped records for the generated and received registration requests and replies. |
| A mobility event notification (based on Mobile-IP control messages) towards the MMAPES process |
| Time stamped records for the processed multicast report and join/leave requests. |

In this exemplary embodiment, the MMAPES process 803 is running on the mobility support elements (e.g., MN 103, FA 109 and HA 107). Each MMAPES process 803 listens for any control message directed to it. By way of an example, it is assumed that MMAPES process 803 uses a first destination Transmission Control Protocol (TCP) port for MMAPES-App_Test_Session_Setup_Req and a second destination TCP port for MMAPES-App_Test_Session_Setup_Ack. In this example, it is assumed that the MN 103 seeks to trigger a MMAPES test session. Thus, the MN 103 generates an MMAPES-App_Test_Session_Setup_Req addressed to the FA 109. This message includes information associated with the test profile 111.

The MMAPES process 803 (listening to the first TCP port) intercepts the MMAPES-App_Test Session_Setup_Req, processes it, and forwards it upstream. Subsequently, a MMAPES process on a different mobility support elements can intercept the request and then process it. The process on the LMSP FA can respond with MMAPES-App_Test_Session_Setup_Ack (the second TCP destination port), and destined for the MN. The HA and the GFA respond with an Ack n case of HA and GFA subscription respectively. The acknowledgement can be processed by intermediate elements and forwarded to the mobile node. At this point, the source can start sending the test traffic (per the profile). When the mobile node moves, the MMAPES process is triggered to generate an MMAPES-App_Test_Session_Setup_Req to the new FA.

FIG. 9 is a diagram of a process for inspecting packets associated with mobility and multicast support, according to various exemplary embodiments. As with the element 800 of FIG. 8, a mobility support element 900 includes a mobility support protocol process 901 and a MMAPES process 903. The process 901 interfaces with lower layer protocols 905. The MMAPES process 903 communicates with other MMAPES processes 907 and 909 (process 909 is a MMAPES collector process). Under the scenario of FIG. 9, transparent inspection is used between the mobility support process 901 and lower level network layers 905 to inspect packets associated with mobility and multicast support. Accordingly, this layer 905 can inspect packets to identify those associated with mobility and multicast events generated or received by the mobility support process 901. When such packet is detected, the corresponding information is provided to the application that extracts the information identified above (as described for each of elements).

The above described processes relating to performance monitoring may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 10:
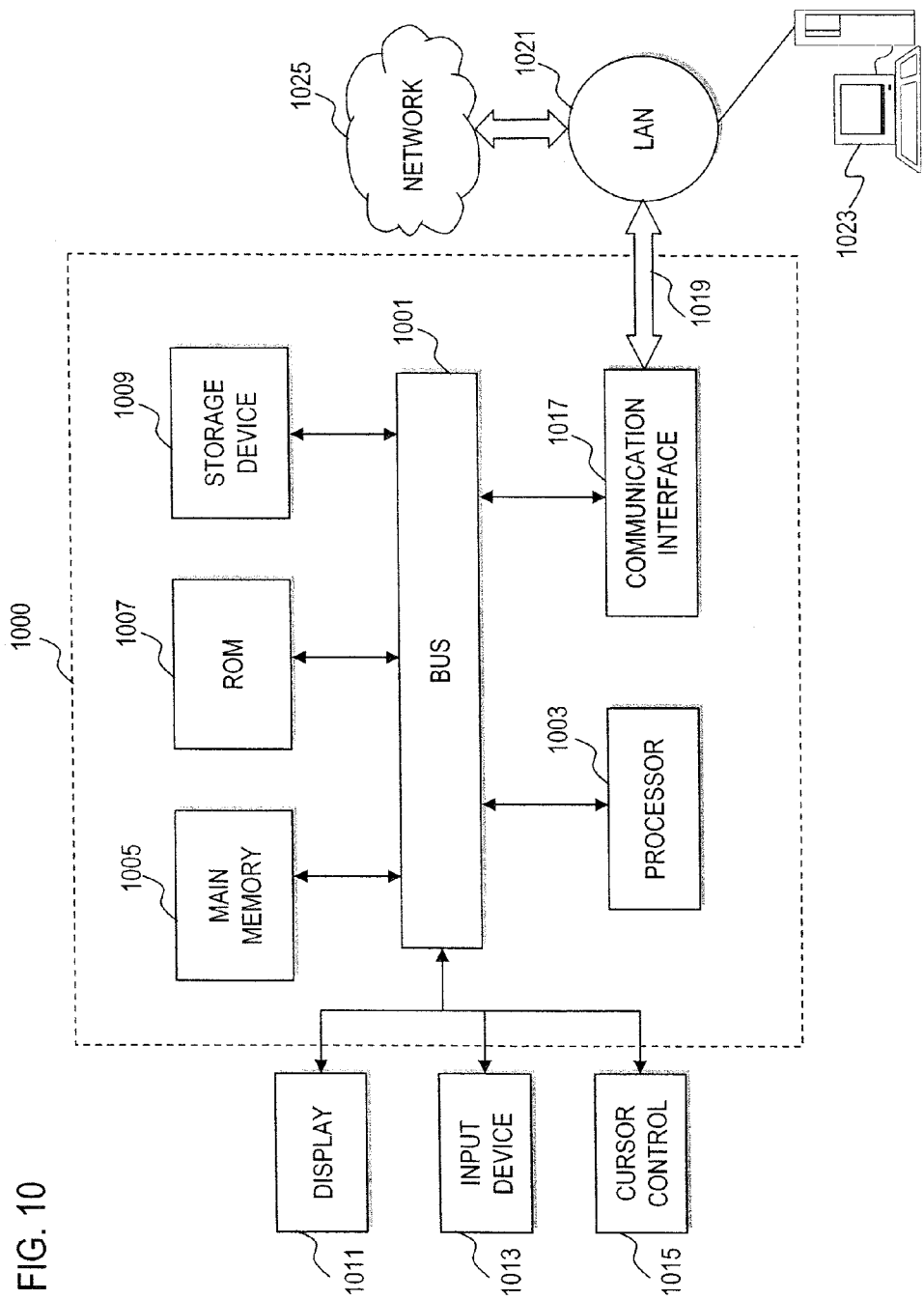
FIG. 10 is a diagram of a computer system that can be used to implement various exemplary embodiments.

FIG. 10 illustrates a computer system 1000 upon which an exemplary embodiment can be implemented. For example, the processes described herein can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment of the invention, the processes described herein are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement the exemplary embodiment. Thus, exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
    generating a test profile for determining performance on a per individual segment basis of links within a multicast network;
    uploading the test profile on a mobile host that is configured to communicate over the multicast network, wherein the mobile host is further configured to participate in a test session according to the test profile;
    collecting test session information tracked by the mobile host for evaluation of metrics for the performance of the individual link segments within the multicast network;
    attributing a performance anomaly associated with one of the metrics to a network event; and
    generating a multicast datagram for the test session, wherein an identifier is embedded in the multicast datagram or encapsulated in a header of the multicast datagram for tracking purposes.

2. A method according to claim 1, wherein the metrics relate to either joining and leaving a multicast group, channel change time, replication efficiency, packet loss, delay, or jitter.

3. A method according to claim 1, further comprising:
    determining the performance anomaly based on the collected test session information; and
    correlating the performance anomaly with one or more mobility and multicast events.

4. A method according to claim 1, further comprising:
    monitoring the performance of the individual link segments within the multicast network based on the collected test session information; and
    performing an audit of the multicast network, according to the monitoring step, to ensure satisfaction of a service level agreement.

5. A method according to claim 1, the method further comprising:
    dynamically modifying the test profile during the test session.

6. A method according to claim 1, wherein the mobile host is configured to operate over a wireless access network that includes a home agent that is configured to track location of the mobile host in support of mobility services.

7. A system comprising:
    a test module configured to generate a test profile for determining performance on a per individual segment basis of links within a multicast network, wherein a mobile host is configured to load the test profile for participation in a test session according to the test profile; and
    a collection module configured to collect test session information tracked by the mobile host for evaluation of metrics for the performance of the individual link segments within the multicast network,
    wherein a multicast datagram is generated for the test session, the multicast datagram having an embedded identifier or a header that is encapsulated for tracking purposes,
    wherein a performance anomaly associated with one of the metrics is attributed to a network event.

8. A system according to claim 7, wherein the metrics relate to either joining and leaving a multicast group, channel change time, replication efficiency, packet loss, delay, or jitter.

9. A system according to claim 7, further comprising:
    a performance evaluation module configured to determine the performance anomaly based on the collected test session information, and to correlate the performance anomaly with one or more mobility and multicast events.

10. A system according to claim 7, wherein the performance of the individual link segments within the multicast network is monitored and audited based on the collected test session information for ensuring satisfaction of a service level agreement.

11. A system according to claim 7, wherein the test module is further configured to dynamically modify the test profile during the test session.

12. A system according to claim 7, wherein the mobile host is configured to operate over a wireless access network that includes a home agent that is configured to track location of the mobile host in support of mobility services.

13. A method comprising:
    entering an emulation mode of operation for determining performance on a per individual segment basis of links within a multicast network;
    sending a test profile on a network element configured to support mobility of a mobile node, wherein the network element is further configured to output a report on the performance according to the test profile;
    collecting the report to evaluate metrics for the performance of the individual link segments within the multicast network; and
    attributing a performance anomaly associated with one of the metrics to a network event, based on the collected report,
    wherein a multicast datagram related to the performance is generated, the multicast datagram having an embedded identifier or a header that is encapsulated for tracking purposes.

14. A method according to claim 13, wherein the metrics relate to either joining and leaving a multicast group, channel change time, replication efficiency, packet loss, delay, or jitter.

15. A method according to claim 13, further comprising:
   correlating the performance anomaly with one or more mobility and multicast events.

16. A method according to claim 13, further comprising:
   monitoring performance of the multicast network based on the collected report; and
   performing an audit of the multicast network, according to the monitoring step, to ensure satisfaction of a service level agreement.

17. A method according to claim 13, the method further comprising:
   dynamically modifying the test profile during the test session.

18. A method according to claim 13, wherein the network element is a foreign agent that is configured to communicate with a home agent in support of mobility services.

* * * * *